(12) United States Patent
Nanivadekar et al.

(10) Patent No.: US 11,847,221 B2
(45) Date of Patent: Dec. 19, 2023

(54) SYSTEM AND METHOD FOR CONTENT SCANNING USING SPARSE FILES

(71) Applicant: VMware, Inc., Palo Alto, CA (US)

(72) Inventors: Mandar Nanivadekar, Pune (IN); Bharath Kumar Chandrasekhar, Palo Alto, CA (US); Sachin Shinde, Pune (IN)

(73) Assignee: VMWARE, INC., Palo Alto, CA (US)

( * ) Notice: Subject to any disclaimer, the term of this patent is extended or adjusted under 35 U.S.C. 154(b) by 290 days.

(21) Appl. No.: 17/241,000

(22) Filed: Apr. 26, 2021

(65) Prior Publication Data
US 2022/0292192 A1  Sep. 15, 2022

(30) Foreign Application Priority Data
Mar. 12, 2021  (IN) .............. 202141010524

(51) Int. Cl.
*G06F 21/53*  (2013.01)
*G06F 21/56*  (2013.01)

(52) U.S. Cl.
CPC ............ *G06F 21/565* (2013.01); *G06F 21/53* (2013.01); *G06F 2221/034* (2013.01)

(58) Field of Classification Search
CPC ... G06F 21/565; G06F 21/53; G06F 2221/034
See application file for complete search history.

(56) References Cited

U.S. PATENT DOCUMENTS

| | | | |
|---|---|---|---|
| 8,789,049 B2 | 7/2014 | Hutchins et al. | |
| 9,817,766 B1 * | 11/2017 | Si | ........................ G06F 3/0685 |
| 2021/0200866 A1 * | 7/2021 | Strogov | ................ G06F 21/568 |
| 2021/0406371 A1 * | 12/2021 | Mungre | ................ G06F 21/78 |

\* cited by examiner

*Primary Examiner* — Brian F Shaw
(74) *Attorney, Agent, or Firm* — LOZA & LOZA, LLP

(57) ABSTRACT

System and method for executing scan operations on computing systems use a sparse file that represents a storage device of a computing system to scan a file stored in the storage device. The sparse file is created and mounted to a scanner appliance such that the sparse file appears to a scan engine of the scanner appliance as a local storage device. When a read request for the file stored in the storage device is issued from the scan engine that results in an implicit read request to the sparse file, the implicit read request is trapped. While the implicit read request is trapped, data of the file is retrieved from the storage device of the computing system to the scanner appliance using a communication transport. The retrieved data of the file is then scanned using the scan engine at the scanner appliance.

20 Claims, 8 Drawing Sheets

SYSTEM AND METHOD FOR CONTENT SCANNING USING SPARSE FILES

BACKGROUND

This application claims the benefit of Foreign Application Serial No. 202141010524 filed in India entitled "SYSTEM AND METHOD FOR CONTENT SCANNING USING SPARSE FILES", on Mar. 12, 2021, by VMWARE, Inc., which is herein incorporated in its entirety by reference for all purposes.

Endpoint antivirus software is designed to help detect, prevent and eliminate malware on devices. For compliance and security reasons, all organizations install antivirus software on almost all their assets.

When installed, antivirus software can take up a significant amount of system random access memory (RAM) and at least equal amount of storage space. In large data centers, which include numerous physical machines, virtual machines and virtual desktop infrastructures (VDIs) environments, the resource usage of antivirus software can quickly add up to a significantly high amount. In addition, given that there is a high likelihood of similar operating system (OS), patches, installed applications, etc. in these computing environments, there can be a quite a bit of duplication with respect to antivirus operations.

Thus, there is a need for an antivirus software solution in computing environments, such as virtual and physical data centers, that can reduce resource usage and duplication for antivirus operations.

BRIEF DESCRIPTION OF THE DRAWINGS

Throughout the description, similar reference numbers may be used to identify similar elements.

DETAILED DESCRIPTION

Figure 1:
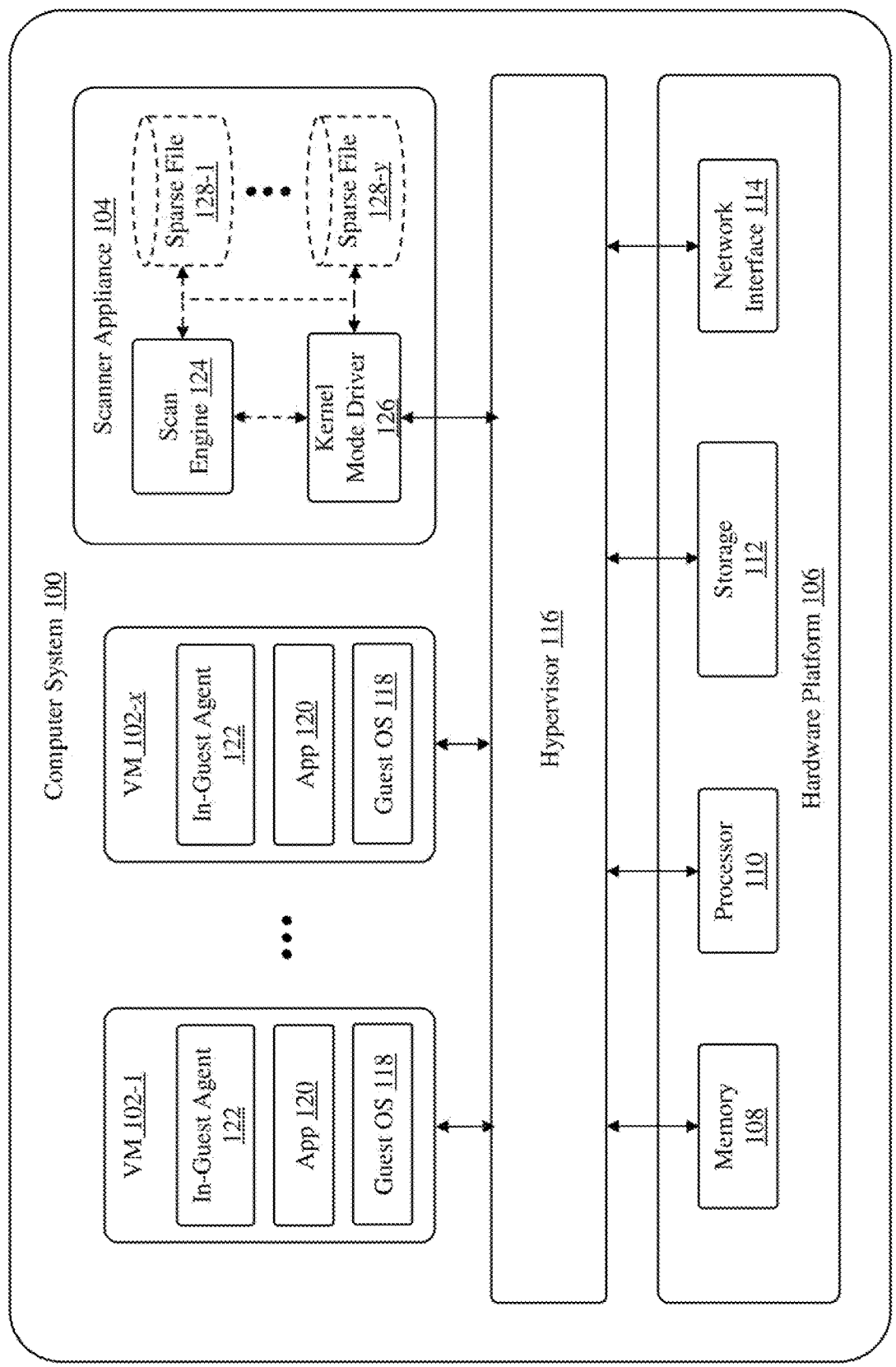
FIG. 1 is a block diagram of a computer system with centralized scanning capability in accordance with an embodiment of the invention.

Security in computing environments with respect to malware is a hard problem to solve, and over the years, the industry and practitioners have resorted to various antivirus scanning techniques to evaluate the posture. These techniques include (1) background scans (sometimes known as periodic manual scans), (2) on-demand scans, (3) on-access scans and (4) behavioral scans. Background scans are full system scans that are typically performed at bootstrap and then executed periodically when automatically initiated following a pre-set schedule or when manually initiated. On-demand scans are full system scans that are typically performed when it is time to ensure everything is in good place, for example, following a compromise, clean up, etc. On-access scans are file scans that are typically performed when a file that has not yet been analyzed is being accessed. Behavioral scans are file scans that are typically performed when a new file/process starts executing.

While the first three types of scans (i.e., background, on-demand and on-access scans rely heavily on static analysis, behavioral scans rely on dynamic analysis to initiate the scans to detect malware or any malicious codes. When anytime something malicious is detected during any of these scans, the scanned system may prevent the associated application/process from executing.

Any systemic approach that consolidates scanning to a central location offers these immediate advantages:
   Manageability: Scanner only needs to be deployed and updated at a single location.
   Time-to-protection: Since all security updates are centralized, it improves the time-to-protection. For example, handling zero-day malware is made a little easier.
   Optimization: Only one copy of scanner code, signature packs, and scan results need to be maintained. Also, caching the results helps avoid repeated scanning.

The security industry has realized these advantages and has developed multiple approaches to address the malware problem. For example, in a computer system with hosted virtual machines, one of the approaches uses a central scanner running in a virtual machine. This approach involves taking a snapshot of a virtual machine that needs to be scanned, sending the virtual machine snapshot to the virtual machine with the central scanner, and performing a scan operation on the virtual machine snapshot using the central scanner.

While this "scan via snapshot" technique is a clean approach, it has a number of challenges. One of the challenges is that the use of a snapshot, which is read-only, introduces an attack vector window as live file system changes are not monitored. Another challenge is that any snapshot created can be seen by any malicious entity in the data center, which introduces additional role-based access control (RBAC) complexity to resolve it. Another challenge is that this approach requires extra storage space, proportional to the number of virtual machines being scanned. Another challenge is that the approach increases guest virtual machine input/output (I/O) resulting in performance overhead after the snapshot is created. Another challenge is that the approach requires additional snapshot management (e.g., creation and deletion) and metadata management through the virtualization software. Another challenge is that the approach requires reconstruction of virtual machine snapshot when a snapshot created for antivirus scan is deleted, which involves computationally expensive operations that reduce virtual machine performance, especially for virtual machines with large virtual storage disks.

Turning now to FIG. 1, a computer system 100 with central scanning capability that addresses at least the challenges described above in accordance with an embodiment of the invention is shown. As shown in FIG. 1, the computer system 100 includes a number of virtual computing instances (VCIs) 102 and a scanner appliance 104, which can perform antivirus scans on the VCIs to detect malicious codes or malware. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. Thus, a VM can be considered to be a virtual computer. A VM may be comprised of a set of specification and configuration files and is backed by the physical resources of a physical host computer. An example of such a VM is a VM created using VMware vSphere® solution made commercially available from VMware, Inc of Palo Alto, California A virtual container is a package that relies on virtual isolation to deploy and run applications that access a shared operating system (OS) kernel. An example of a virtual container is a virtual container created using a Docker engine made available by Docker, Inc. In FIG. 1, the VCIs 102 in the computer system 100 are illustrated as being VMs. However, in other embodiments, the VCIs 102 in the computer system 100 may be other types of VCIs.

As shown in FIG. 1, the computer system 100 includes a physical hardware platform 106, which includes at least one or more system memories 108, one or more processors 110, a storage 112, and a network interface 114. Each system memory 108, which may be random access memory (RAM), is the volatile memory of the computer system 100. Each processor 110 can be any type of a processor, such as a central processing unit (CPU) commonly found in a server computer. The storage 112 can be any type of non-volatile computer storage with one or more storage devices, such as solid-state devices (SSDs) and hard disks. Although the storage 112 is shown as being a local storage, in other embodiments, the storage 112 may be a remote storage, such as a network-attached storage (NAS). The network interface 114 is any interface that allows the computer system 100 to communicate with other devices through one or more computer networks. As an example, the network interface 114 may be a network interface controller (NIC).

The computer system 100 further includes a virtualization software 116 running directly on the hardware platform 106 or on an operation system (OS) of the computer system 100. The virtualization software 116 can support one or more VCIs, e.g., the VMs 102. In addition, the virtualization software 116 can deploy or create VCIs on demand. Although the virtualization software 116 may support different types of VCIs, the virtualization software 116 is described herein as being a hypervisor, which enables sharing of the hardware resources of the host computer 100 by the VMs 102 that are hosted by the hypervisor. One example of a hypervisor that may be used in an embodiment described herein is a VMware ESXi™ hypervisor provided as part of the VMware vSphere® solution made commercially available from VMware, Inc. of Palo Alto, California.

The hypervisor 116 provides a device driver layer configured to map physical resources of the hardware platform 106 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may, for example, function as an equivalent, conventional hardware architecture for its corresponding VM.

In FIG. 1, the computer system 100 is shown to include a number of VMs 102 (i.e., VMs 102-1 . . . 102-*x*) supported by the hypervisor 116. Each of these VMs 102 has a virtual hardware platform, which is an emulation of the physical hardware platform that has been allocated to that VM. Thus, each virtual hardware platform includes at least emulated memory, emulated processor, virtual storage and virtual network interface, which correspond to the memory 108, the processor 110, the storage 112 and the network interface 114, respectively, of the hardware platform 106 of the computer system 100. In some embodiments, the virtual hardware platform for each of the VMs 102 is provided by a virtual machine executable (VMX) module (not illustrated) and a virtual machine monitor (VMM) (not illustrated) for that VM in the hypervisor 116. In these embodiments, there are same number of VMX modules and same number of VMMs as the VMs 102.

With the support of the hypervisor 116, the VMs 102 provide isolated execution spaces for guest software. In the illustrated embodiment, each VM includes a guest operating system (OS) 118, and one or more guest applications 120. The guest OS 118 manages virtual hardware resources made available to the corresponding VM by the hypervisor 116, and, among other things, the guest OS forms a software platform on top of which the guest applications 120 run. Each VM also includes an in-guest agent 122, which operates with the scanner appliance 104 to facilitate antivirus scanning for that VM. The in-guest agents 122 are described in detail below.

The scanner appliance 104 is a centralized scanning mechanism that can perform antivirus scans on the VMs 102. Thus, all the antivirus signature updates can be downloaded and installed on a single machine, i.e., the scanner appliance 104. In addition, a common antivirus reputation database can be maintained to avoid scanning a file that was already scanned and that is common to two or more VMs. However, unlike a conventional central scanner that uses VM snapshots to perform antivirus scans, the scanner appliance 104 utilizes the concept of making the storage devices or virtual disks of the VMs 102 available as one or more local sparse files for the scanner appliance 104, which do not take up much storage for the scanner appliance. The antivirus scans are then performed by the scanner appliance 104 using the local sparse files, which are mounted to the scanner appliance such that the local sparse files appear as local file systems to the scanner appliance. The local sparse files are mapped directly with the disk data or disk blocks of the remote VMs 102 so that content being scanned can be transparently retrieved from the VMs 102 via the local sparse files. The scanner appliance 104 operates at the file system layer, which is one level above the sparse files. For example, if a VM wants to scan a directory C:\windows that has been mapped to H:\windows in the scanner appliance 104, then the scanner appliance will enumerate the files in H:\windows and start scanning these files. The scanner appliance 104 will perform read operations and, since the sparse file appears as a locally mounted disk, the read operations will hit the sparse file in terms of read blocks, which are trapped until the corresponding blocks are retrieved from the VM, as described in detail below. Consequently, the scanning technique utilized by the scanner appliance 104 is agnostic to the file system and the platform, and thus, it does not require file system reverse engineering.

While the conventional "scan via snapshot" technique offers an efficient mechanism for static scanning contents in real-time on only the files on which some activity is happening, the scanning technique utilized by the scanner appliance 104 allows for efficient static scanning as well as dynamic scanning for background and on-demand scans by not ever touching the guest VMs 102. This is due to the fact that the antivirus scanning performed by the scanner appliance 104 is on data from the actual virtual disks of the VMs 102 rather than from the snapshots of the VM disks.

As shown in FIG. 1, the scanner appliance 104 includes a scan engine 124 and a kernel mode driver 126. The scan engine 124 operates to create one or more sparse files 128 (e.g., 128-1 . . . 128-y) to access virtual disks of the VMs 102 that need scanning. In an embodiment, for each VM disk that needs to be scanned, a sparse file of equivalent size plus some minimal space for metadata is created by the scan engine. The metadata may include information regarding the VM disk, such as disk attributes and volume details, as well as information to help reach the VM disk, such as a mapping between the sparse file and the VM disk (e.g., sparse disk 1←→Guest VM1/PHYSICALDISK0) and communication protocol details to help the scanner appliance 104 communicate with the remote VM. For example, if the VM disk is 100 gigabyte (GB) in size, then a sparse file of 100 GB plus some minimal space for metadata is created by the scan engine 124. However, as with all sparse files, the sparse file of 100 GB that is created does not occupy any physical storage space for the scanner appliance 104. The file system on each VM disk may be FAT32, NTFS, ReFS, ext3, ext4, ZFS etc., which needs to be detected by scan engine 124. In an embodiment, based on the file system identified, the corresponding driver will be loaded into the scanner appliance 104 by its operating system. In addition to detecting the file system for each VM disk, the scan engine 124 also needs to read some specific blocks on the associated sparse disk for which the file system driver will issue read operations. In an embodiment, the sparse file representing each guest VM disk is inserted into the device stack of the scanner appliance 104 using a disk driver. This will make the guest VM disk appear as a local disk to the scanner appliance 104 via the sparse file. However, the sparse file still does not occupy any physical storage space for the scanner appliance 104. It is noted here that some of the VMs 102 may have more than one virtual disk. Thus, in some cases, multiple sparse files will be created to scan multiple virtual disks of the VMs 102.

Once the remote VM disk is visible as a local disk at the scanner appliance 104 and the volumes of the VM disk are enumerated, the disks need to be mapped correctly by the scan engine 124. Thus, for example, the guest volume C: may be enumerated as F: on the scanner appliance OS. In case of many scan requests from multiple guest VMs, the volume letters may run out and the volume Globally Unique Identifiers (GUIDs) may need to be used for the mapping. For example, C:\ on one of the guest VMs can be mapped to \\?\Volume{26a21bda-a627-11d7-9931-806e6f6e6963} on the scanner appliance 104.

The scanner appliance 104 may be implemented as software running in the computer system 100. In some embodiments, the scanner appliance 104 may be implemented as a VCI hosted in the computer system 100. In a particular embodiment, the scanner appliance 104 is implemented as a VM supported by the hypervisor 116, similar to the VMs 102.

The kernel mode driver 126 running on the scanner appliance 104 is responsible for simulating a remote file system and facilitating guest I/O operations for the remote files/volume to be scanned. The kernel mode driver 126 operates in the kernel space of the scanner appliance 104. When the scan engine 124 wants to read a file or a volume that appears to be locally available, the appliance file system driver (or appliance volume driver) installed by the appliance OS will determine what needs to be read, which results in an implicit read request for stored data, e.g., disk blocks of data, being generated to the sparse file since it is the backing store. The implicit read request is then captured by the kernel mode driver 126 to retrieve the requested data from the VM disk, which has been mapped to the sparse file. The retrieved data is then routed to the scan engine 124 by the kernel mode driver 126. Thus, to the scan engine 124, it appears that the data was retrieved from the local file system.

The kernel mode driver 126 works with the in-guest agents 122, which are running in the VMs 102. Each in-guest agent 122 of a VM 102 communicates with the kernel mode driver 126 to provide access to the virtual disk(s) of that VM for the scan engine 124. In operation, the kernel mode driver 126 traps local read requests of files made to each sparse file by the scan engine 124 and sends remote read messages to the in-guest agent 122 of a VM 102 that has the virtual disk that is mapped to the sparse file to retrieve the requested file from the mapped virtual disk. When a remote read message from the kernel mode driver 126 is received by the in-guest agent 122, the in-guest agent fetches the data, e.g., disk blocks of data, corresponding to the request file from the virtual disk, which is stored in a physical storage of the computer system 100, e.g., a local physical disk, and sends the fetched data to the kernel mode driver 126, which routes the fetched data to the scan engine 124. In some embodiments, the read operation is executed in terms of disk blocks, which are being transferred from the VM to the scanner appliance 104. In these embodiments, the disk blocks contain file data, where each block may have data for multiple files. Thus, a file may only occupy a small part of a disk block, which is a sparse file byte range. In some instances, a file may be very large and occupy multiple disk blocks. Each read operation in terms of sparse read blocks is an independent operation, which maps to a remote read of the virtual disk. Thus, if a file maps to ten (10) read blocks on the sparse file, then there could be ten (10) read operations issued by the kernel mode driver 126. In some embodiments, the kernel mode driver 126 may also combine multiple contiguous requests as a single request, and may also use caching.

In addition to assisting the kernel mode driver 126 to access VM disks, the in-guest agents 122 running in the VMs 102 provide disk information of the respective VM disks. For example, when requested, each in-guest agent 122 in a VM 102 can enumerate all disks attached to the VM and enumerate all volumes that need to be scanned. In addition, the in-guest agent 122 can collect all disk attributes, such as disk size, disk type, block size, sector size, unusable blocks, communication transport etc., which are transmitted to the scan engine 124 to be used to perform scanning operations on the virtual disks that are attached to the VM.

Figure 2:
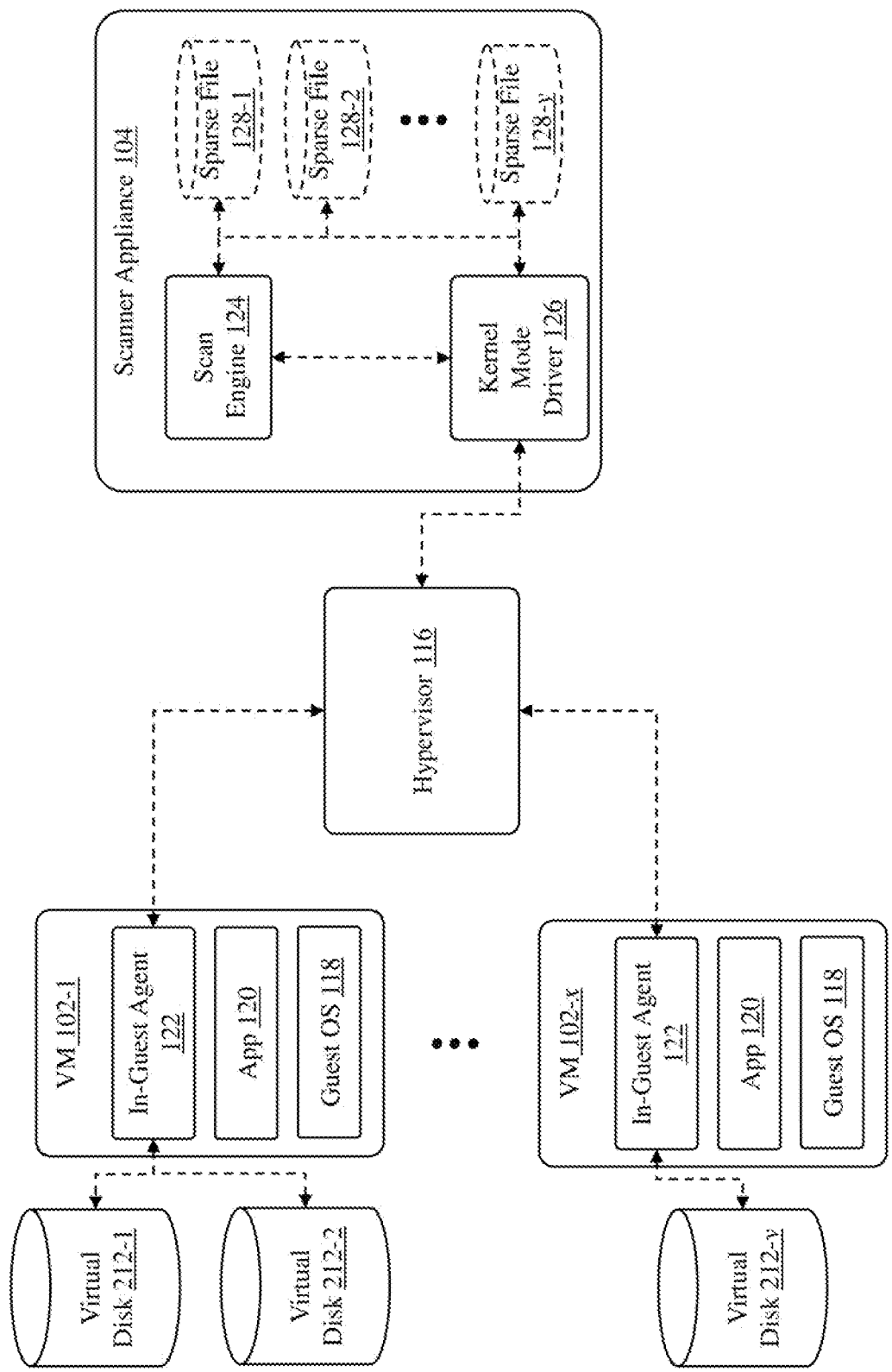
FIG. 2 illustrates interactions of different components in the computer system shown in FIG. 1 to perform scan operations in accordance with an embodiment of the invention.

Scan operations performed by the scanner appliance 104 in accordance with embodiments of the invention are described with reference to FIG. 2, which shows the interactions of different components in the computer system 100. As illustrated in FIG. 2, in this example, the VM 102-1 has two virtual disks 212-1 and 212-2 and the VM 102-x has one virtual disk 212-y. These virtual disks 212-1, 212-2 and 212-y are mapped to the sparse files 128-1, 128-1 and 128-y of the scanner appliance 104.

In an embodiment, a scan operation may be initiated by any of the in-guest agents 122 in the VMs 102 in response to a scan request or some file activity. As an example, a background or on-demand scan of the VM 102-1 may be initiated by the in-guest agent 122 in the VM 102-1 in response to a request made by a user via a user interface (UI), which may be provided by the computer system 100 or another computer system connected to the computer system 100, or a request made by an application running in the VM 102-1, such as a scanning scheduler. When such a scan request is received by the in-guest agent 122 in the VM 102-1, a scan message is transmitted from that in-guest agent to the scan engine 124 in the scanner appliance 104 to perform the background or on-demand scan operation. The message may include, but not limited to, identification of the virtual disks and/or files to be scanned, disk details and file path information.

As another example, an on-access or behavioral scan of a file stored in the virtual disk 212-y of the VM 102-x may be initiated by the in-guest agent 122 in the VM 102-x in response to the file being accessed or executed. When an access or execution of the file is detected by the in-guest agent 122 in the VM 102-x, a scan message is transmitted from that in-guest agent to the scan engine 124 in the scanner appliance 104 to perform a scan operation of the file. The message may include, but not limited to, identification of the file to be scanned and path information of the file.

When a scan message is received by the scan engine 124, contents of one or more files are read by the scan engine 124 to scan for any malicious code. In order to read the contents of a file in a particular virtual disk of a particular VM in the computer system 100, a native read request is made by the scan engine 124 for the file to be scanned, which appears as a file in the local file system. The native read request is then translated by the appliance file system driver as an implicit read request on the sparse file, which has been mounted and mapped to the particular virtual disk. As an example, let's assume that the scan engine 124 wants to scan a file with the file path H:\windows\notepad.exe, which has been mapped to Guest VM1/C:\Windows\notepad.exe, where H: is a local drive of the scanner appliance 104 and C: is a remote drive of the VM. In this example, the scan engine 124 will try to scan the file "notepad.exe" in the local file system, i.e., H: drive. The native read request may be Read ("H:\windows\notepad.exe", offset, length). This native read request is then translated by the appliance file system driver as an implicit read request on the target sparse file that has been mapped to the remote C: drive. The implicit read request may be Read (target sparse file, offset', size).

If a sparse file has not yet been created for the targeted virtual disk, e.g., the remote C: drive, the sparse file for the virtual disk is created by the scan engine 124 and mounted as a local disk. The sparse file is then mapped to the targeted virtual disk so that the virtual disk appears as part of the local file system of the scanner appliance 104.

For example, if a file to be scanned is stored in the virtual disk 212-1 of the VM 102-1, a read request for the file made by the scan engine 124 on the local file system is translated to an implicit read request to the sparse file 128-1, which is mapped to the virtual disk 212-1. As another example, if a file to be scanned is stored in the virtual disk 212-y of the VM 102-x, a read request for the file made by the scan engine 124 on the local file system is translated to an implicit read request to the sparse file 128-y, which is mapped to the virtual disk 212-y. If the sparse file 128-1 or 128-y has not yet been created, the sparse file is created and mounted as a local disk, and also mapped to the corresponding virtual disk so that the virtual disk appears as part of the local file system of the scanner appliance 104.

For each implicit read request for a file in a virtual disk issued to a sparse file, the implicit read request is trapped by the kernel mode driver 126. While the implicit read request is pending, the requested file is fetched by the kernel mode driver 126 from the actual targeted virtual disk. Specifically, a data retrieval request is sent from the kernel mode driver 126 to the in-guest agent 122 in the VM 102, which has the targeted virtual disk, to read data of the file, e.g., in a disk block, stored in the physical disk. The data of the file is then sent from the in-guest agent 122 to the kernel mode driver 126, where the data is passed to the scan engine 124 so that the data of the file can be scanned. Thus, to the scan engine 124, the data of the file appears to be from a local disk attached to the scanner appliance 104, while the data of the file is actually retrieved from the virtual disk through a different channel, which is transparent to the scan engine 124. The results of these file scans can be sent to the respective in-guest agents 122, which can initiate an appropriate action when malicious code is found, such as blocking the files from execution or quarantining the files.

For example, if an implicit read request for a file in the virtual disk 212-1 is issued to the sparse file 128-1, the implicit read request is trapped by the kernel mode driver 126. While the implicit read request is pending, a data retrieval request is sent from the kernel mode driver 126 to the in-guest agent 122 in the VM 102-1, to read a disk block that contains the data of the file stored in the physical storage 112 of the computer system 100 as the virtual disk 212-1. The disk block is retrieved by the in-guest agent 122 in the VM 102-1 and sent to the kernel mode driver 126, where the disk block is transmitted to the scan engine 124. The disk block is then scanned by the scan engine 124 for malicious code using static or dynamic analysis. The static analysis may involve using standard techniques of checking file hash, disassembling the file and looking at the portable executable (PE) header contents, etc. The dynamic analysis may involve sandboxing in the scanner appliance 104 to the extent possible using known techniques or using some external service. In some embodiments, the scanner engine 124 may perform a partial read on a file, e.g., first few bytes of the file, before passing the file as malicious or safe, and thus, the entire file may not be read. The results of the scan may be sent to the in-guest agent 122 in the VM 102-1, which can initiate an appropriate action if malicious code was found.

Figure 3A:
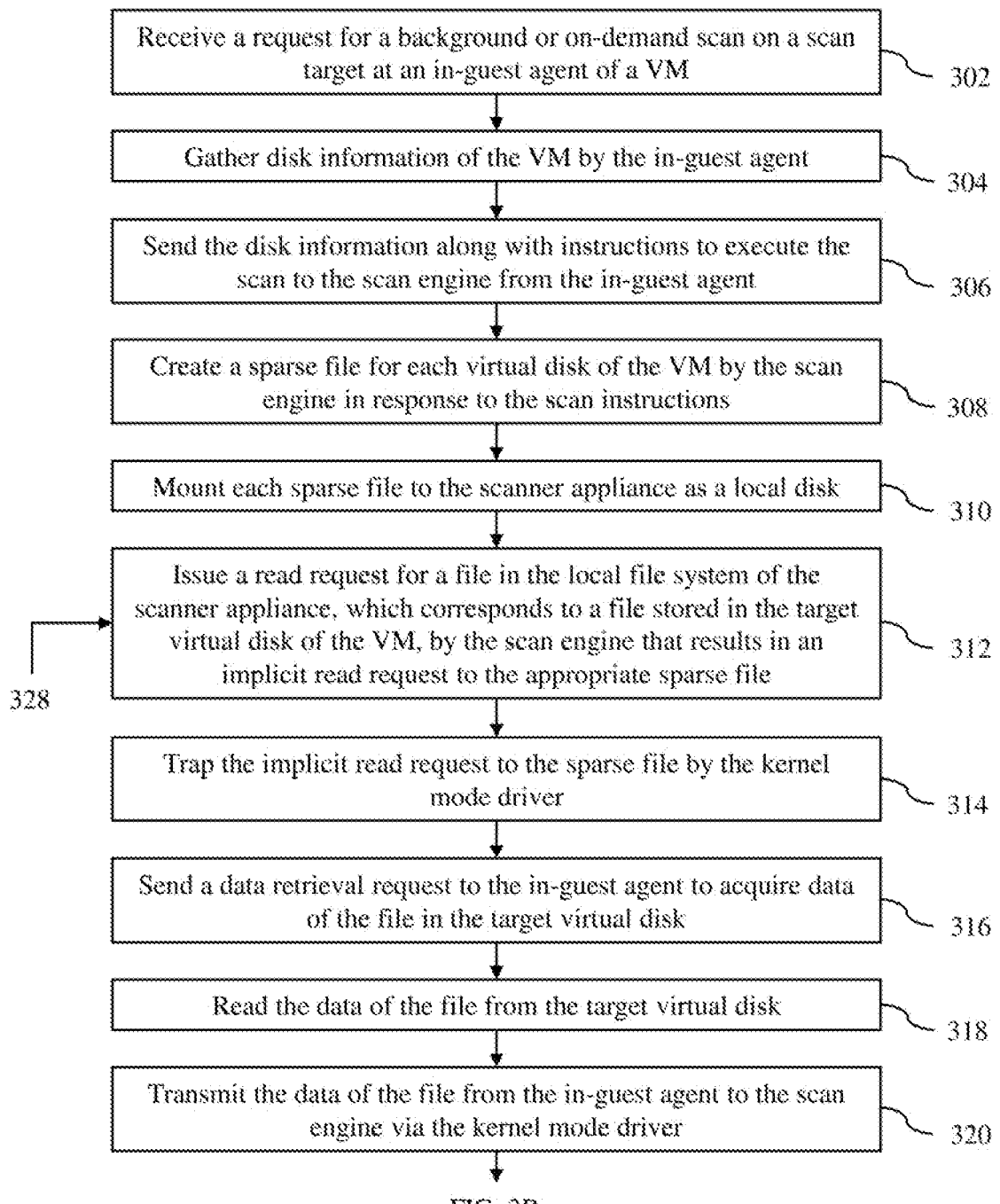
FIGS. 3A and 3B is a flow diagram of a process of performing a background or on-demand scan in the computer system shown in FIG. 1 in accordance with an embodiment of the invention.
Figure 3B:
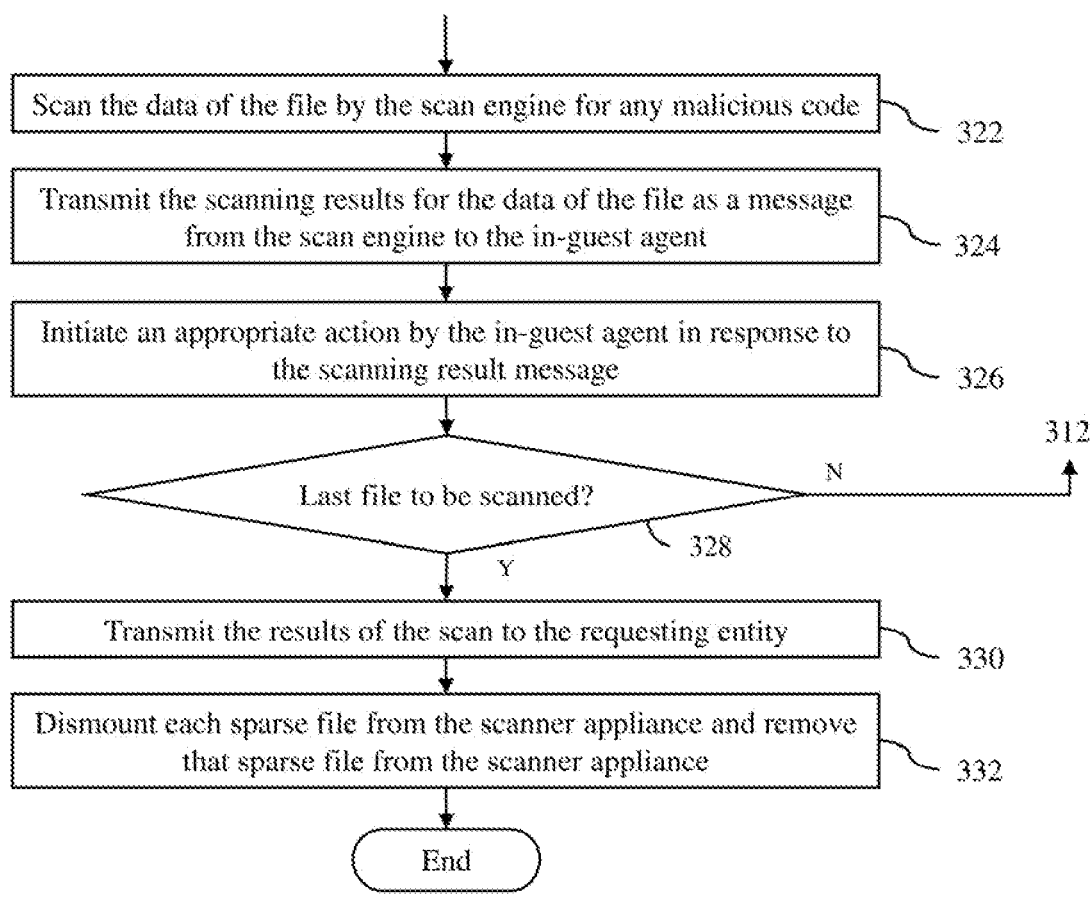

A process of performing a background or on-demand scan in the computer system 100 in accordance with an embodiment of the invention is now described with reference to a process flow diagram shown in FIG. 3. In this description, the background or on-demand scan is being performed for the VM 102-1, which has the virtual disks 212-1 and 212-2. The process begins at step 302, where a request for a background or on-demand scan on a scan target is received at the in-guest agent 122 in the VM 102-1. The scan request may be from a UI or an automated process running in the computer system 100 or another computer system connected to the computer system 100. For a background scan, the scan target is all the files for the VM 102-1 in the computer system 100. For an on-demand scan, the scan target is for a subset of all the files for the VM 102-1, which may be a single file or a group of files in a specific location of a file system. If the scan is initiated by a user, the UI may be used to enter a command to initiate the scan. The UI may be provided by the computer system 100 or another computer system connected to the computer system 100.

Next, at step 304, disk information of the VM 102-1 is gathered by the in-guest agent 122 of the VM 102-1. In an embodiment, the in-guest agent 122 collects the requested disk information in response to a request from the requesting entity, e.g., the UI. In another embodiment, the in-guest agent 122 may have collected the disk information earlier and have kept the disk information current as changes are made to the VM 102-1 with respect to virtual disks attached to the VM 102-1. The disk information may include a list of the virtual disks attached to the VM 102-1 and the volumes that need to be scanned. The disk information may further include attributes for each of the virtual disks attached to the VM 102-1, such as disk size, disk type, block size, sector size, unusable blocks, communication transport etc.

Next, at step 306, the disk information along with instructions to execute the scan are sent to the scan engine 124 from the in-guest agent 122 of the VM 102-1. The scan instructions include at least the type of scan requested and the scan target, e.g., the files that need to be scanned. At step 308, in response to the scan instructions, a sparse file for each virtual disk of the VM 102-1 is created by the scan engine 124. Thus, in this example, the sparse files 128-1 and 128-2 are created for the virtual disks 212-1 and 212-2, respectively. In an embodiment, the sparse file for each virtual disk is equal to the exact size of that virtual disk with some space to store additional metadata, such as disk attributes, volume details and communication transport information.

Next, at step 310, each sparse file is mounted to the scanner appliance 104 as a local disk using an appropriate disk driver so that the sparse file appears as a local storage resource to the scan engine 124. After each sparse file is mounted, any input/output (I/O) to the sparse file is tracked by the kernel mode driver 126 and any read operations done by the scanner OS in response to reads issued by the scan engine 124 are caught by the kernel mode driver 126.

Next, at step 312, a read request for a file in the local file system of the scanner appliance 104, which corresponds to a file stored in the target virtual disk of the VM 102-1, is issued by the scan engine 124 that results in an implicit read request to the appropriate sparse file, which has been mapped to the target virtual disk of the VM 102-1. For example, if a file to the scanned is in the virtual disk 212-1, then a read request is issued by the scan engine 124 that results in an implicit read request to the sparse file 128-1, which has been mapped to the virtual disk 212-1. At step 314, the implicit read request to the sparse file is trapped by the kernel mode driver 126.

Next, at step 316, a data retrieval request is sent to the in-guest agent 122 of the VM 102-1 from the kernel mode driver 126 to acquire data of the file, e.g., a disk block containing the data of the file, in the target virtual disk of the VM 102-1, which is stored on the physical storage 112 of the computer system 100. In an embodiment, communication between the in-guest agent 122 of the VM 102-1 and the kernel mode driver 126 can be made using VMware Virtual Machine Communication Interface (VMCI), which is secure for a virtual environment. In other embodiments, the communication can happen over a secure TCP/IP channel. In still other embodiments, Paravirtual Remote Direct Memory Access (vRDMA) can be used as the communication transport.

Next, at step 318, the data of the file is read from the target virtual disk of the VM 102-1 by the in-guest agent 122 of the VM 102-1 to acquire the contents of the file. At step 320, the data of the file is transmitted from the in-guest agent 122 of the VM 102-1 to the scan engine 124 via the kernel mode driver 126.

Next, at step 322, the data of the file is scanned by the scan engine 124 for any malicious code. The data of the file may be scanned using one or more known antivirus scanning algorithms. At block 324, the scanning results for the data of the file are transmitted as a message from the scan engine 124 to the in-guest agent 122 of the VM 102-1. In some embodiments, the scanning results for the data of the file are transmitted to the in-guest agent 122 of the VM 102-1 only when malicious code is found. At block 326, in response to the scanning result message, an appropriate action is initiated by the in-guest agent 122 of the VM 102-1. The appropriate action may include, but not limited to, blocking the file from execution or quarantining the file, which may be executed by the in-guest agent 122 of the VM 102-1 or another process running in the VM 102-1.

Next, at step 328, a determination is made by the scan engine 124 whether the last scanned file is the last file to be scanned. If no, then the process proceeds back to step 312, where another read request is made by the scan engine for the next file to be scanned. If yes, then the process proceeds to step 330.

Next, at step 330, the results of the scan are transmitted to the requesting entity by the scan engine 124. In this embodiment, the results of all the file scans may be consolidated and sent after all the relevant files have been scanned. However, in other embodiments, results of each file scan may be sent after that file has been scanned.

Next, at step 332, each sparse file is dismounted from the scanner appliance 104 and removed or deleted from the scanner appliance 104. In this example, the sparse files 128-1 and 128-2, which are mapped to the virtual disks 212-1 and 212-2 of the VM 102-1, are dismounted from the scanner appliance 104 and removed from the scanner appliance 104. In this embodiment, the sparse files for virtual disks of the VMs 102 are created and maintained only when the sparse files are needed for scanning. However, in other embodiments, some or all of the sparse files created for a scan may remain mounted to the scanner appliance 104 to be used for subsequent scans. In these embodiments, steps involving the creation of one or more sparse files of the VM may be skipped if the sparse files were created during an earlier scan.

During this scanning process, an antivirus reputation database may be updated for each file being scanned. The antivirus reputation database may be maintained at the scanner appliance 104 to avoid duplicate scanning of files that may be shared by multiple VMs in the computer system 100.

Figure 4A:
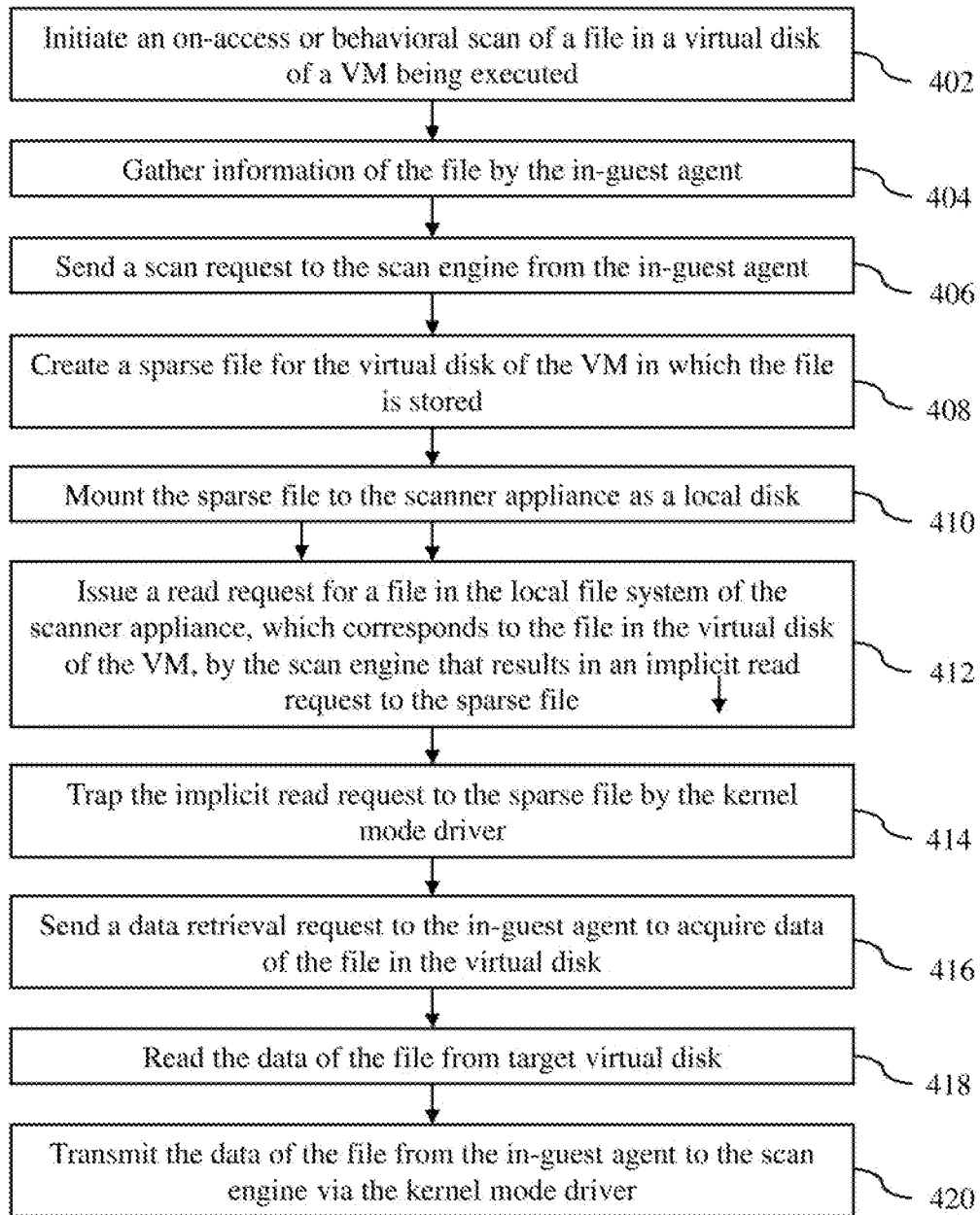
FIGS. 4A and 4B is a flow diagram of a process of performing an on-access or behavioral scan in the computer system shown in FIG. 1 in accordance with an embodiment of the invention.
Figure 4B:
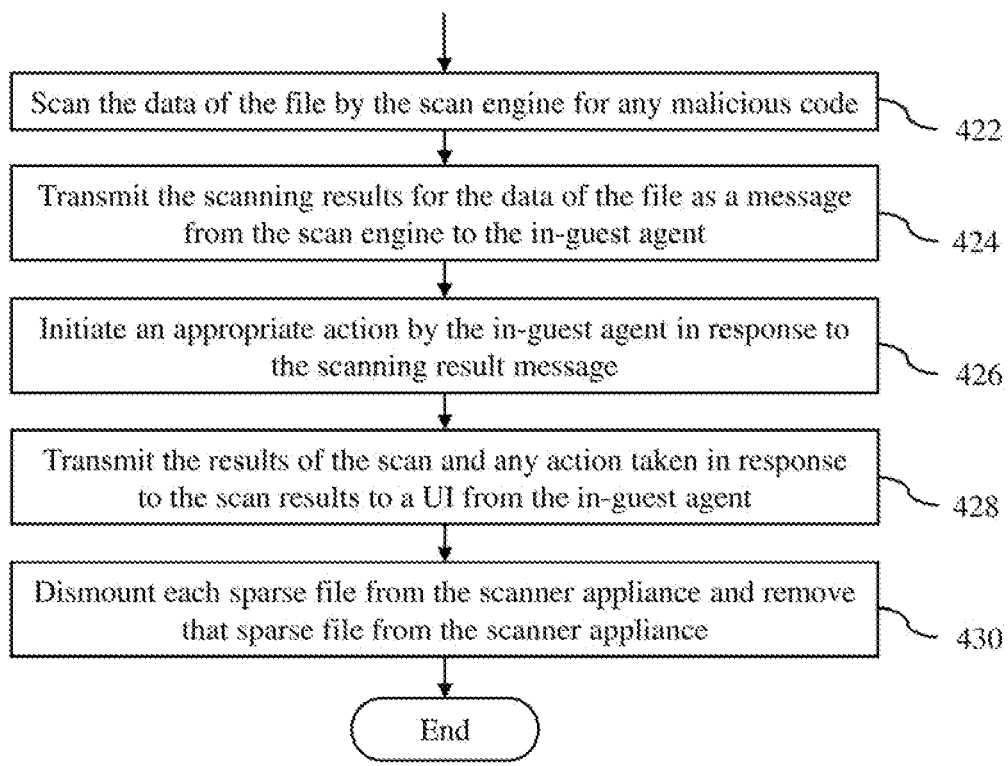

A process of performing an on-access or behavioral scan in the computer system 100 in accordance with an embodiment of the invention is now described with reference to a process flow diagram shown in FIG. 4. In this description, the on-access or behavioral scan is being performed for a file in the virtual disk 212-$y$ of the VM 102-$x$. The process begins at step 402, where an on-access or behavioral scan of the file in the virtual disk 212-$y$ being accessed or executed is initiated by the in-guest agent in the VM 102-$x$. In an embodiment, files that need to be scanned when accessed or executed are monitored by at least some of the in-guest agents 122 in their respective VMs 102 and an on-access or behavioral scan is initiated when one of the files that are monitored is accessed or executed.

Next, at step 404, information of the file to be scanned is gathered by the in-guest agent 122 of the VM 102-$x$. The file information may include file details, such as filename, file path and metadata of disk/volume on which the file exists.

Next, at step 406, a scan request is sent to the scan engine 124 from in-guest agent 122 of the VM 102-$x$. The scan request includes at least instructions for the scan being requested and the file information. At step 408, in response to the scan request, a sparse file for the virtual disk 212-$y$ of the VM 102-$x$ in which the file exists is created by the scan engine 124. Thus, in this example, the sparse file 128-$y$ is created for the virtual disk 212-$y$ of the VM 102-$x$ in which the file is stored. In an embodiment, the sparse file for the virtual disk is equal to the exact size of that virtual disk with some space to store additional metadata, such as disk attributes, volume details and communication transport information.

Next, at step 410, the sparse file is mounted to the scanner appliance 104 as a local disk using an appropriate disk driver so that the sparse file appears as a local storage resource to the scan engine 124. As noted above, when a sparse file is mounted, any I/O to the sparse file is tracked by the kernel mode driver 126 and any read operations done by the scanner OS in response to reads issued by the scan engine 124 are caught by the kernel mode driver 126.

Next, at step 412, a read request for a file in the local file system of the scanner appliance 104, which corresponds to the file stored in the virtual disk 212-$y$ of the VM 102-$x$, is issued by the scan engine 124 that results in an implicit read request to the sparse file 128-$y$, which has been mapped to the virtual disk 212-$y$ of the VM 102-$x$. At step 414, the implicit read request to the sparse file is trapped by the kernel mode driver 126.

Next, at step 416, a data retrieval request is sent to the in-guest agent 122 of the VM 102-$x$ from the kernel mode driver 126 to acquire data of the file, e.g., a disk block containing the data of the file, in the virtual disk 212-$y$ of the VM 102-$x$, which is stored on the physical storage 112 of the computer system 100. In an embodiment, communication between the in-guest agent 122 of the VM 102-$x$ and the kernel mode driver 126 can be made using VMCI.

Next, at step 418, the data of the file is read from the virtual disk 212-$y$ of the VM 102-$x$ by the in-guest agent 122 of the VM 102-$x$ to acquire the contents of the file. At step 420, the data of the file is transmitted from the in-guest agent 122 of the VM 102-$x$ to the scan engine 124 via the kernel mode driver 126.

Next, at step 422, the data of the file is scanned by the scan engine 124 for any malicious code. The data of the file may be scanned using one or more known antivirus scanning algorithms. At block 424, the scanning results for the data of the file are transmitted as a message from the scan engine 124 to the in-guest agent 122 of the VM 102-$x$. In some embodiments, the scanning results for the data of the file are transmitted to the in-guest agent 122 of the VM 102-$x$ only when malicious code is found. At block 426, in response to the scanning result message, an appropriate action is initiated by the in-guest agent 122 of the VM 102-$x$. The appropriate action may include, but not limited to, blocking the file from execution or quarantining the file, which may be executed by the in-guest agent 122 of the VM 102-$x$ or another process running in the VM 102-$x$.

Next, at an optional step 428, results of the scan and any action taken in response to the scan results are transmitted to a UI from the in-guest agent 122 of the VM 102$x$. Thus, a user of the UI can readily view the scan results and any action taken in response to the scan results.

Next, at step 430, the sparse disk 212-$y$ is dismounted from the scanner appliance 104 and removed or deleted from the scanner appliance 104. In this example, the sparse file 128-$y$, which is mapped to the virtual disk 212-$y$ of the VM 102-$x$, is dismounted from the scanner appliance 104 and removed from the scanner appliance 104. In this embodiment, the sparse files for virtual disks of the VMs 102 are created and maintained only when the sparse files are needed for scanning. However, in other embodiments, some or all of the sparse files created for a scan may remain mounted to the scanner appliance 104 to be used for subsequent scans. In these embodiments, steps involving the creation of one or more sparse files of the VM may be skipped if the sparse files were created during an earlier scan.

During this scanning process, the antivirus reputation database may be updated for the file being scanned. As noted above, the antivirus reputation database may be maintained at the scanner appliance 104 to avoid duplicate scanning of files that may be shared by multiple VMs 102 in the computer system 100.

In the embodiment illustrated in FIG. 1, the computers that are scanned, i.e., the VMs 102, and the scanner appliance 104 performing the scans are included in the same computing environment, e.g., the computer system 100. However, in other embodiments, the computers that are scanned and the scanner appliance 104 may be in different computing environments, as illustrated in FIG. 5.

Figure 5:
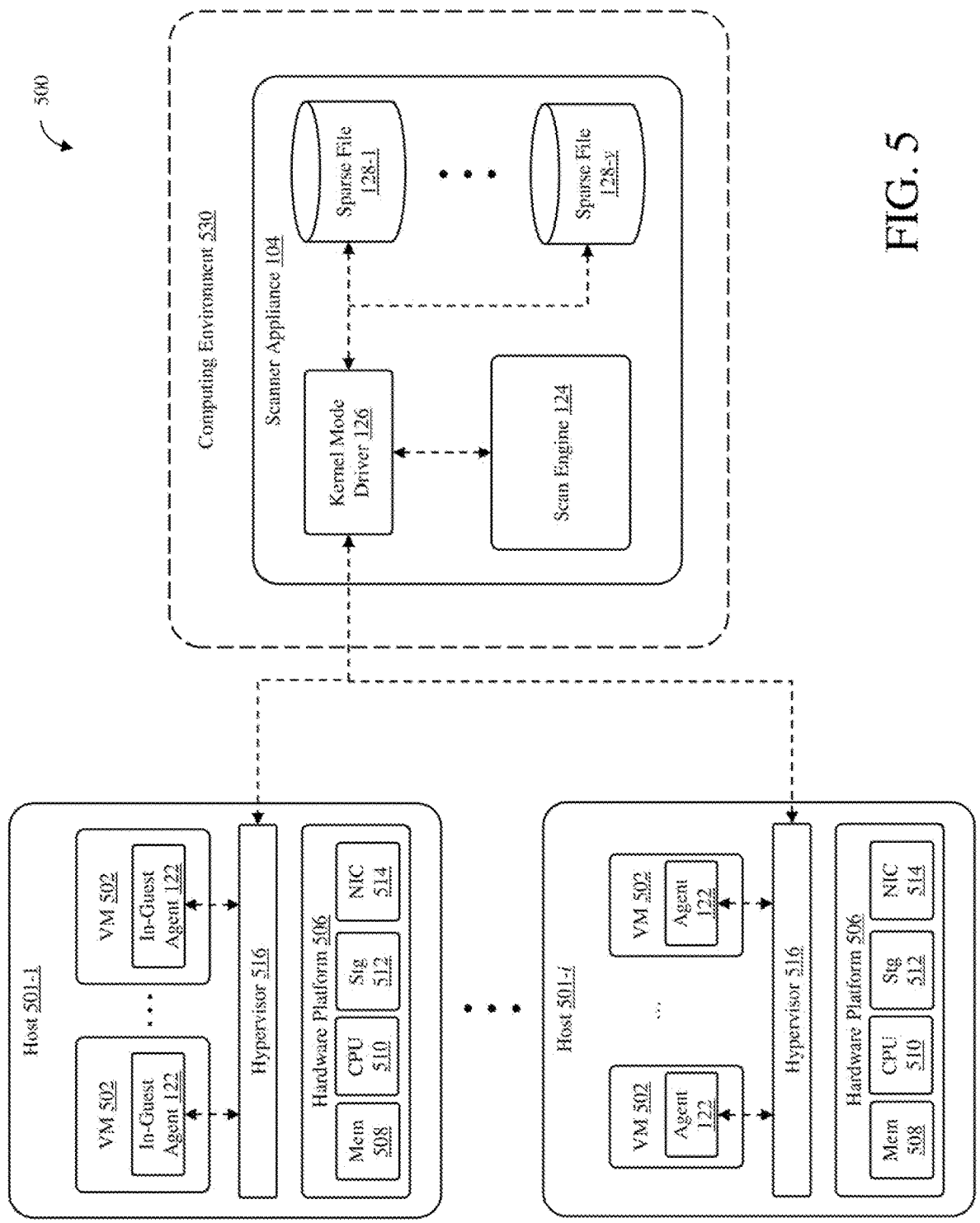
FIG. 5 is a block diagram of a distributed computer system with centralized scanning capability in accordance with an embodiment of the invention.

FIG. 5 illustrates a distributed computer system 500 with centralized scanning capability in accordance with an embodiment of the invention. In this embodiment, the scanner appliance 104 is operating outside of computing environments provided by host computers 501-1 . . . 501-$i$ that includes the computers, i.e., the VCIs 502 in the form of the VMs, that can be scanned by the scanner appliance. Each of the host computers 501 may be similar to the computer system 100. Thus, each host computer includes a hardware platform 506, which includes physical resources, such as memory 508, processor (e.g., CPU) 510, storage 512 and network interface (e.g., NIC) 514, and a virtualization software 516 in the form of a hypervisor. The hypervisor 516 of each host computer uses the physical resources of that host computer to provide virtualized resources for the VMs 502 deployed in the host computers. Similar to the embodiment shown in FIG. 1, each of the VMs 502 in the host computers 501-1 . . . 501-$i$ includes the in-guest agent 122.

In FIG. 5, the scanner appliance 104 is running in a computing environment 530 that is distinct and separate from the computing environments of the host computers 501-1 . . . 501-$i$. In an embodiment, the scanner appliance 104 may be running in a computer system, similar to the computer system 100. In another embodiment, the scanner appliance 104 may be running in a cloud computing environment, which may be a public cloud. Thus, in this embodiment, the scanner appliance 104 can take advantages of functions, capabilities and services that are available in the public cloud. In other embodiments, the scanner appliance 104 may be running in one of the host computers 501-1 . . . 501-$i$ or running in one of the VCIs 502 (e.g., a VM) in the host computers 501-1 . . . 501-$i$.

The scanning operations performed in the distributed computer system 500 are similar to the scanning operations performed in the computer system 100, which were described above. One significant difference is the communication transport used in the distributed computer system 500 between the kernel mode driver 126 of the scanner appliance 104 and at least some of the in-guest agents 122 of the VMs 502 running in the host computers 501-1 . . . 501-$i$. In addition, if the scanner appliance 104 is deployed in a public cloud, the scanner appliance 104 may be able to take full advantages of cloud scanning capabilities in a cloud platform as the endpoint file system can be analyzed in the cloud with necessary authentication.

In the embodiments illustrated in FIGS. 1 and 5, the computers that are scanned by the scanner appliance 104 are VCIs 102 and 502, e.g., VMs. However, in other embodiments, the computers that are scanned by the scanner appliance 104 may be physical computers, each with its own in-guest agent 122. Again, the scanning operations performed in such an embodiment are similar to the scanning operations performed in the computer system 100. Similar to the embodiment of FIG. 5, one significant difference is the communication transport used between the kernel mode driver 126 of the scanner appliance 104 and at least some of the in-guest agents 122 of the physical computers.

In this disclosure, the sparse files that are created and used by the scanner appliance 104 represent virtual or physical storage disks of computing systems, which can be VMs or physical computers. However, in other embodiments, the sparse files that are created and used by the scanner appliance 104 may represent other types of virtual or physical storage devices used by computing systems, such as solid state drives (SSD) devices.

Figure 6:
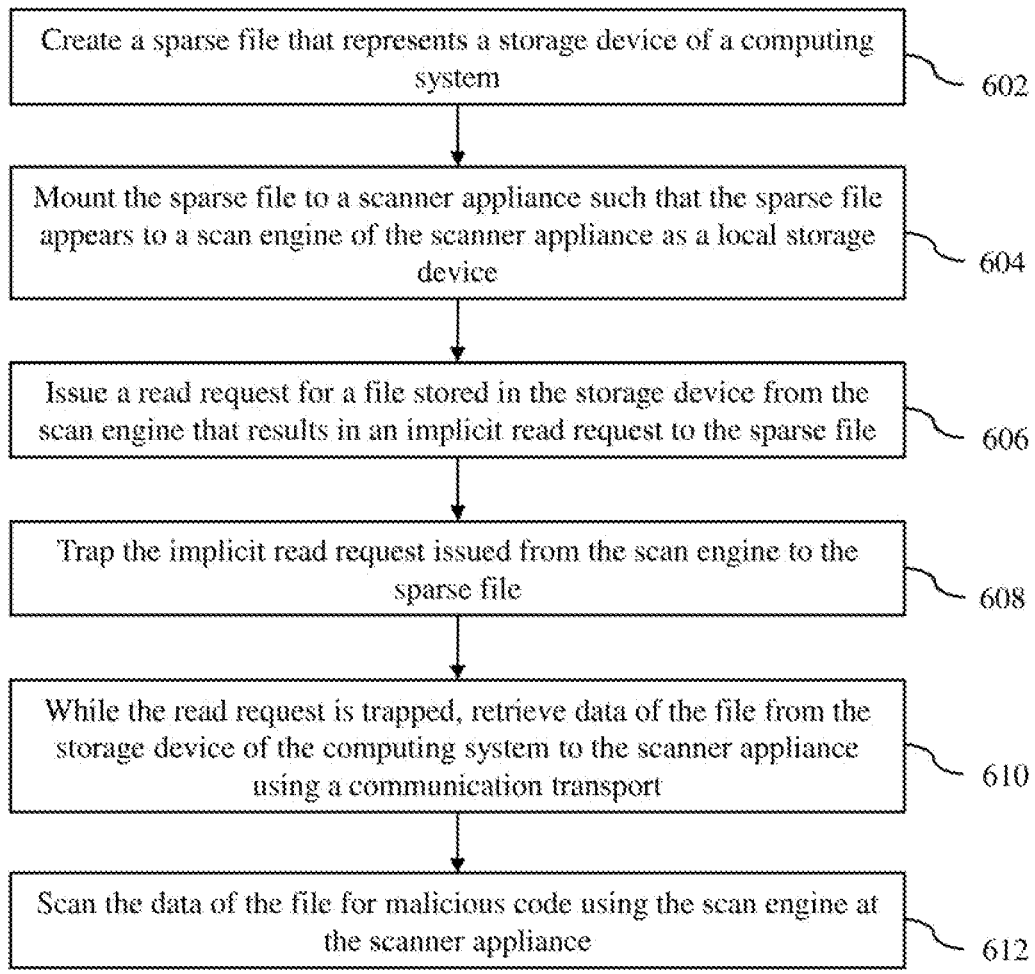
FIG. 6 is a flow diagram of a computer-implemented method for executing scan operations on computing systems in accordance with an embodiment of the invention.

A computer-implemented method for executing scan operations on computing systems, e.g., the VMs 102 and 502, in accordance with an embodiment of the invention is described with reference to a flow diagram of FIG. 6. At block 602, a sparse file that represents a storage device of a computing system is created. At block 604, the sparse file is mounted to a scanner appliance such that the sparse file appears to a scan engine of the scanner appliance as a local storage device. At block 606, a read request for a file stored in the storage device is issued from the scan engine that results in an implicit read request to the sparse file. At block 608, the implicit read request to the sparse file is trapped. At block 610, while the implicit read request is trapped, data of the file is retrieved from the storage device of the computing system to the scanner appliance using a communication transport. At block 612, the data of the file are scanned for malicious code using the scan engine at the scanner appliance.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, non-volatile memory, NVMe device, persistent memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for executing scan operations on computing systems, the method comprising:
creating a sparse file that represents a storage device of a computing system;
mounting the sparse file to a scanner appliance such that the sparse file appears to a scan engine of the scanner appliance as a local storage device;
issuing a read request for a file stored in the storage device from the scan engine that results in an implicit read request to the sparse file;

trapping the implicit read request to the sparse file;
while the implicit read request is trapped, retrieving data of the file from the storage device of the computing system to the scanner appliance using a communication transport;
scanning the data of the file for malicious code using the scan engine at the scanner appliance; and
dismounting the sparse file from the scanner appliance after a current scan operation is complete and before a subsequent operation involving the storage device of the computing system.

2. The method of claim 1, wherein trapping the implicit read request to the sparse file includes trapping, by a kernel mode driver running in the scanner appliance, the implicit read request to the sparse file.

3. The method of claim 2, wherein retrieving the data of the file from the storage device of the computing system includes sending a request from the kernel mode driver to an in-guest agent running in the computing system to read the data of the file from the storage device of the computing system.

4. The method of claim 3, further comprising detecting an access or execution of the file by the in-guest agent and sending a message from the in-guest agent to the scan engine to perform a scanning operation on the file.

5. The method of claim 1, further comprising, in response to a detection of malicious code in the data of the file, initiating an action to address the malicious code in the data of the file.

6. The method of claim 1, wherein the sparse file includes metadata of attributes of the storage device and details of a volume on the storage device.

7. The method of claim 1, wherein the computing system is a virtual computing instance running in a host computer, wherein the virtual computing instance uses allocated virtual resources provided by a virtualization software running in the host computer.

8. The method of claim 1, wherein dismounting the sparse file from the scanner appliance includes deleting the sparse file after the current scan operation is complete and before the subsequent operation involving the storage device of the computing system.

9. A non-transitory computer-readable storage medium containing program instructions for executing scan operations on computing systems, wherein execution of the program instructions by one or more processors of a computer system causes the one or more processors to perform steps comprising:
creating a sparse file that represents a storage device of a computing system;
mounting the sparse file to a scanner appliance such that the sparse file appears to a scan engine of the scanner appliance as a local storage device;
issuing a read request for a file stored in the storage device from the scan engine that results in an implicit read request to the sparse file;
trapping the implicit read request to the sparse file;
while the implicit read request is trapped, retrieving data of the file from the storage device of the computing system to the scanner appliance using a communication transport;
scanning the data of the file for malicious code using the scan engine at the scanner appliance; and
dismounting the sparse file from the scanner appliance after a current scan operation is complete and before a subsequent operation involving the storage device of the computing system.

10. The computer-readable storage medium of claim 9, wherein trapping the implicit read request to the sparse file includes trapping, by a kernel mode driver running in the scanner appliance, the implicit read request to the sparse file.

11. The computer-readable storage medium of claim 10, wherein retrieving the data of the file from the storage device of the computing system includes sending a request from the kernel mode driver to an in-guest agent running in the computing system to read the data of the file from the storage device of the computing system.

12. The computer-readable storage medium of claim 11, wherein the steps further comprise detecting an access or execution of the file by the in-guest agent and sending a message from the in-guest agent to the scan engine to perform a scanning operation on the file.

13. The computer-readable storage medium of claim 9, wherein the steps further comprise, in response to a detection of malicious code in the data of the file, initiating an action to address the malicious code in the data of the file.

14. The computer-readable storage medium of claim 9, wherein the sparse file includes metadata of attributes of the storage device and details of a volume on the storage device.

15. The computer-readable storage medium of claim 9, wherein the computing system is a virtual computing instance running in a host computer, wherein the virtual computing instance uses allocated virtual resources provided by a virtualization software running in the host computer.

16. The computer-readable storage medium of claim 9, wherein dismounting the sparse file from the scanner appliance includes deleting the sparse file after the current scan operation is complete and before the subsequent operation involving the storage device of the computing system.

17. A system comprising:
memory; and
at least one processor configured to:
create a sparse file that represents a storage device of a computing system;
mount the sparse file to a scanner appliance such that the sparse file appears to a scan engine of the scanner appliance as a local storage device;
issue a read request for a file stored in the storage device from the scan engine that results in an implicit read request to the sparse file;
trap the implicit read request issued from the scan engine to the sparse file;
while the implicit read request is trapped, retrieve data of the file from the storage device of the computing system to the scanner appliance using a communication transport;
scan the data of the file for malicious code using the scan engine at the scanner appliance; and
dismount the sparse file from the scanner appliance after a current scan operation is complete and before a subsequent operation involving the storage device of the computing system.

18. The system of claim 17, wherein the at least one processor is configured to trap the implicit read request to the sparse file using a kernel mode driver running in the scanner appliance.

19. The system of claim 18, wherein the at least one processor is configured to send a request from the kernel mode driver to an in-guest agent running in the computing system to read the data of the file from the storage device of the computing system.

20. The system of claim 19, wherein the at least one processor is configured to detect an access or execution of the file using the in-guest agent and send a message from the in-guest agent to the scan engine to perform a scanning operation on the file.

\* \* \* \* \*